United States Patent
Kumar et al.

(10) Patent No.: US 12,231,236 B2
(45) Date of Patent: Feb. 18, 2025

(54) METHOD AND NODE FOR TRANSMITTING CRITICAL INFORMATION IN A WIRELESS NETWORK

(71) Applicant: Samsung Electronics Co., Ltd., Suwon-si (KR)

(72) Inventors: Kopperla Ranjith Kumar, Bangalore (IN); Katyayani Seshakumar Kavuluri, Bangalore (IN); Dinakar Reddy Yammanuru, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 17/830,753

(22) Filed: Jun. 2, 2022

(65) Prior Publication Data

US 2022/0399958 A1    Dec. 15, 2022

Related U.S. Application Data

(63) Continuation of application No. PCT/KR2022/007544, filed on May 27, 2022.

(30) Foreign Application Priority Data

Jun. 11, 2021   (IN) .............................. 202141026163
Dec. 15, 2021   (IN) ............................ 2021 41026163

(51) Int. Cl.
*H04L 1/08*      (2006.01)
*H04L 1/1867*    (2023.01)
*H04L 5/00*      (2006.01)

(52) U.S. Cl.
CPC .............. *H04L 1/08* (2013.01); *H04L 1/1867* (2013.01); *H04L 5/0053* (2013.01)

(58) Field of Classification Search
None
See application file for complete search history.

(56) References Cited

U.S. PATENT DOCUMENTS 7,693,070 B2   4/2010   Rider et al.
9,331,913 B2   5/2016   Campbell
(Continued)

FOREIGN PATENT DOCUMENTS

EP     1 588 527 A1      10/2005
EP     1 511 346 B1      11/2017
KR     10-2198246 B1     1/2021

OTHER PUBLICATIONS

3rd Generation Partnership Project; Technical Specification Group Core Network and Terminals; Interface between the Control Plane and the User Plane Nodes; Stage 3 (Release 17), 3GPP TS 29.244 V17.0.0, Mar. 30, 2021.

(Continued)

*Primary Examiner* — Saumit Shah
(74) *Attorney, Agent, or Firm* — Jefferson IP Law, LLP

(57) ABSTRACT

A method for transmitting critical information by a node in a control and user plane separation (CUPS) in a wireless network is provided. The method includes determining, by the node in the CUPS of the wireless network, a retry threshold for retransmission of a Sx message comprising critical information to another node is reached. The method also includes activating, by the node, a message re-transmission timer, in response to determining that there try threshold for the transmission of the Sx message to the another node is reached, and retransmitting, by the node, the Sx message to the another node at exponential intervals of time until an expiry of the message re-transmission timer.

20 Claims, 11 Drawing Sheets

(56) References Cited

U.S. PATENT DOCUMENTS

| | | |
|---|---|---|
| 9,621,444 B2 | 4/2017 | Liu et al. |
| 9,826,570 B1* | 11/2017 | Gupta ................. H04L 65/1073 |
| 10,681,222 B2 | 6/2020 | Yan et al. |
| 11,229,080 B2 | 1/2022 | Lee et al. |
| 2020/0186977 A1 | 6/2020 | Xia |
| 2021/0126741 A1* | 4/2021 | Cao ........................ H04L 1/188 |
| 2021/0306817 A1 | 9/2021 | Kim |
| 2021/0409375 A1* | 12/2021 | Burakovsky ........ H04L 63/0236 |
| 2022/0400410 A1* | 12/2022 | Yang .................... H04L 47/746 |

OTHER PUBLICATIONS

Nec et al., Reporting User Plane Inactivity on N4, C4-181015, 3GPP TSG CT4 Meeting #82, Jan. 12, 2018, Gothenburg, Sweden.
Ericsson, Pre-defined PDR, C4-192010, 3GPP TSG-CT WG4 Meeting #91, May 3, 2019, Reno, US.
Huawei, Pseudo—CR on Partial failure for CUPS, C4-1T321T, 3GPP TSG CT4 Meeting #78, May 19, 2017, Zhangiajie, P.R. China.
International Search Report dated Aug. 23, 2022, issued in Application No. PCT/KR2022/007544.
Indian Office Action dated Feb. 15, 2023, issued in Indian Patent Application No. 202141026163.

* cited by examiner

METHOD AND NODE FOR TRANSMITTING CRITICAL INFORMATION IN A WIRELESS NETWORK

CROSS-REFERENCE TO RELATED APPLICATION(S)

This application is a continuation application, claiming priority under § 365(c), of an International application No. PCT/KR2022/007544, filed on May 27, 2022, which is based on and claims the benefit of an Indian provisional patent application number 202141026163, filed on Jun. 11, 2021, in the Indian Patent Office, and of an Indian Complete patent application number 202141026163, filed on Dec. 15, 2021, in the Indian Patent Office, the disclosure of each of which is incorporated by reference herein in its entirety.

BACKGROUND

1. Field

The disclosure relates to wireless communication. More particularly, the disclosure relates to a method and node for transmitting critical information in a control and user plane separation (CUPS) in a wireless network.

2. Description of Related Art

With advancement in technology, control plane and user plane separation (CUPS) architectural enhancement was introduced to separate functionalities of control plane (CP) node and user plane (UP). The architectural enhancement focused on separating the UP activities into a separate Node such that the UP node can be deployed nearer to a radio access network (RAN) Node to reduce latency.

Charging plays a crucial role for operators and is directly linked with revenue to the operator based on Users data usage. Charging calculation should be very accurate such that over charging is not made to user and charging records should not be lost (under charging). The UP Node performs calculation of critical information i.e., charging information about used data and shares the critical information to the CP Node in Sx message over user datagram protocol (UDP) protocol. However, due to internet protocol (IP) fluctuations at times data packets may be lost between the CP Node and the UP Node with high probability of losing the critical information which results in the loss of charging data of a user. Since the CP node and the UP node hold millions of subscriber sessions, the IP fluctuation will result in loss of charging information for huge number of subscribers which impacts revenue of the operators.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and node for transmitting critical information in CUPS in a wireless network by activating a message re-transmission timer when a specific number of retries for transmission of an Sx message comprising the critical information, such as for example but not limited to charging information, usage information, or the like, to another node is reached. Therefore, the critical information is not lost when the specific number of retries for the transmission of the Sx message is reached. Rather the message re-transmission timer is used based on which a frequency of retransmission of the Sx message is continued.

Another aspect of the disclosure is to retransmit the Sx message to the another node at exponential intervals of time until an expiry of the message re-transmission timer. As a result, the wireless network is not overburdened with multiple messages.

Additional aspects will be set forth in part in the description which follows and, in part, will be apparent from the description, or may be learned by practice of the presented embodiments.

In accordance with an aspect of the disclosure, a method for transmitting critical information by node in a control and user plane separation (CUPS) in a wireless network is provided. The method includes determining, by a node in a control and user plane separation (CUPS) of the wireless network, a retry threshold for retransmission of a Sx message comprising critical information to another node is reached. Further, the method also includes activating, by the node, a message re-transmission timer, in response to determining that the retry threshold for the transmission of the Sx message to the another node is reached and retransmitting, by the node, the Sx message to the another node at exponential intervals of time until an expiry of the message re-transmission timer.

In an embodiment of the disclosure, determining, by the node, the retry threshold for retransmission of the Sx message to the another node is reached includes transmitting, by the node, the Sx message to the another node in the CUPS of the wireless network and determining, by the node, a Sx response message is not received from the another node. Further, the method includes retransmitting, by the node, the Sx message to the another node until the retry threshold is reached by increasing a time to wait for each of the Sx response message in an exponential pattern and determining, by the node, the retry threshold for the retransmission of the Sx message to the another node is reached. The retry threshold is a configured number of retries.

In an embodiment of the disclosure, the Sx message is a session report request message transmitted from a user plane (UP) node to a control plane (CP) node, wherein the UP node is the node and the CP node is the another node.

In an embodiment of the disclosure, the Sx message is a session delete request message transmitted from a CP node to a UP node, wherein the CP node is the node and the UP node is the another node.

In an embodiment of the disclosure, the retry threshold for retransmission of the Sx message is determined based on a T1 timer which retires for a specific number of times based on a packet forwarding control protocol (PFCP) protocol.

In an embodiment of the disclosure, the critical information is charging information is determined by the UP node by tracking a network usage per packet data networks (PDN) session based on a volume of data packets transferred and the charging information is transmitted to the CP node in the Sx message.

In an embodiment of the disclosure, the CP node generates a charging data record (CDR) comprising a volume of data used for a particular PDN service bearer for a user.

In an embodiment of the disclosure, the message re-transmission timer is linked with a session in one of a unstructured data storage function (UDSF) and a local memory for storing a session information.

In an embodiment of the disclosure, the method further includes receiving, by the node, the Sx response message from the another node before the expiry of the message re-transmission timer, and deleting, by the node, the session information from one of a and a local memory comprising the session information.

In accordance with another aspect of the disclosure, a node in a control and user plane separation (CUPS) for transmitting critical information in a wireless network is provided. The node includes a memory, at least one processor, a communicator and a critical information management controller. The critical information management controller is configured to determine a retry threshold for retransmission of a Sx message comprising critical information to another node is reached and activate a message re-transmission timer, in response to determining that the retry threshold for the transmission of the Sx message to the another node is reached. Further, the critical information management controller is configured to retransmit the Sx message to another node at exponential intervals of time until an expiry of the message re-transmission timer.

In accordance with another aspect of the disclosure, a method for managing charging information for data traffic in a control and user plane separation (CUPS) in wireless network is provided. The method includes transmitting, by a node, the charging information for the data traffic to another node (100b) of the wireless network and triggering, by the node, at least one first timer subsequent to transmitting the charging information. The method also includes retrying, by the node, the at least one first timer at a plurality of intervals pre-set by an operator, until receipt of acknowledgement from another node of the wireless network and detecting, by the node, a non-receipt of acknowledgement subsequent to completion of retrying of the at least one first timer. Further, the method includes triggering, by the node, at least one second timer, in response to detecting the non-receipt of acknowledgement subsequent to completion of retrying the at least one first timer. Furthermore, the method includes retrying, by the node, the at least one second timer at a plurality of intervals until receipt of acknowledgement from the another node of the wireless network, wherein a magnitude of each subsequent interval of the plurality of intervals increases exponentially, and deleting, by the node, the charging information by the first plane on detection of elapse of configured number of retries.

In accordance with another aspect of the disclosure, a node for managing charging information for data traffic in a control and user plane separation (CUPS) in wireless network is provided. The node includes a memory, at least one processor, a communicator and a critical information management controller. The critical information management controller is configured to transmit the charging information for the data traffic to another node of the wireless network and trigger at least one first timer subsequent to transmitting the charging information. The critical information management controller is configured to retry the at least one first timer at a plurality of intervals pre-set by an operator, until receipt of acknowledgement from another node of the wireless network and detect a non-receipt of acknowledgement subsequent to completion of retrying of the at least one first timer. Further, the critical information management controller is configured to trigger at least one second timer, in response to detecting the non-receipt of acknowledgement subsequent to completion of retrying the at least one first timer. Further, the critical information management controller is configured to retry the at least one second timer at a plurality of intervals until receipt of acknowledgement from the another node (100b) of the wireless network, wherein a magnitude of each subsequent interval of the a plurality of intervals increases exponentially and delete the charging information by the first plane on detection of elapse of configured number of retries.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
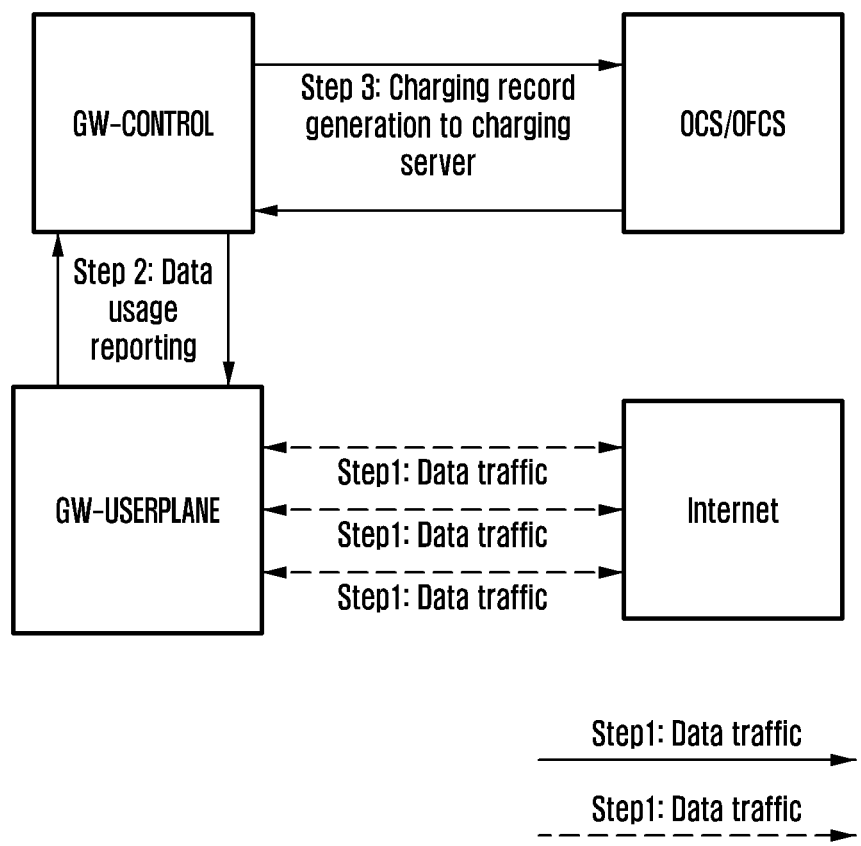
FIG. 1 illustrates a charging architecture in control and user plane separation (CUPS) environment in a wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly, the embodiments of the disclosure herein disclose a method for transmitting critical information by node in a control and user plane separation (CUPS) in a wireless network. The method includes determining, by a node in a control and user plane separation (CUPS) of the wireless network, a retry threshold for retransmission of a Sx message comprising critical information to another node is reached. Further, the method also includes activating, by the node, a message re-transmission timer, in response to determining that the retry threshold for the transmission of the Sx message to the another node is reached and retransmitting, by the node, the Sx message to the another node at exponential intervals of time until an expiry of the message re-transmission timer.

Accordingly, the embodiments of the disclosure herein disclose a node in a control and user plane separation (CUPS) for transmitting critical information in a wireless network. The node includes a memory, a processor, a communicator and a critical information management controller. The critical information management controller is configured to determine a retry threshold for retransmission of a Sx message comprising critical information to another node is reached and activate a message re-transmission timer, in response to determining that the retry threshold for the transmission of the Sx message to the another node is reached. Further, the critical information management controller is configured to retransmit the Sx message to another node at exponential intervals of time until an expiry of the message re-transmission timer.

The $3^{rd}$ generation partnership project (3GPP) TS 29.244 Rel. 16 Sec 5.18 discusses about the enhanced PFCP association release (EPFAR) procedures to address the loss of usage information when any node (CP or UP Node) wants to perform the PFCP Association Release. Using the procedure the UP Node will transmit session report request (with termination trigger set) message for all the sessions having non-zero usage information. However, the procedures do not address the issues of reporting the usage information to the CP Node if all the Session Report Request messages are lost in the network.

In CUPS environment, the charging calculations will be performed by the UP Node based on the data usage and will be conveyed to control plane node in intervals or during Session Termination using Sx Messages (PFCP protocol over UDP). If the Sx message is lost in between the user plane node and the control plane node during termination events, then charging information will be completely lost. In the proposed method, if the termination response is not received then the node will not delete the session context. The originating Node (CP node or UP node) will keep retrying the message which contains the critical information (example, charging Info) in an exponential manner up to a long configured value. Since the IP or network fluctuations will not be present for long time, the message will be received to the terminating node and charging is made normally. As the retries are made exponentially, the load in the network will also have very minimal impact.

FIG. 1 illustrates a charging architecture in CUPS environment in wireless network according to an embodiment of the disclosure.

Referring to FIG. 1, the CP nodes include GW-C in long term evolution (LTE) and session management function (SMF) in $5^{th}$ generation (5G) core (5GC) and the UP nodes include gateway (GW)-U in LTE and user plane function (UPF) in 5GC. Due to the functional split in the CUPS architecture the CP nodes perform the control plane functionalities like communicating with all other nodes, such as for example but not limited to policy and charging rules function (PCRF)/policy control function (PCF), mobility management entity (MME)/access and mobility management function (AMF) and charging servers in the wireless network. The UP nodes are configured to handle data plane part and communicate usage information to CP nodes based on requirement and during session termination. Once the usage information is received by the CP node, the CP node generates charging data records (CDR) with the received information and transmits update towards charging systems. Communication about the sessions in between the CP node and UP node is performed using the PFCP protocol on the Sx Interface over UDP protocol. Their liability of delivery of the charging information and the usage information is made using a T1 timer and specific number of retransmissions.

According to 3GPP, the retransmission mechanism between any two CUPS nodes is done when a request message is transmitted by the UP node or the CP node and if a response message is not received, then the transmitter CUPS node is required to retransmit the same message again after the configured T1 timer expires until specific number of retransmissions. If the response message is not received even after the N1 retransmissions, then the transmitter CUPS node will detect a failure due to no response from the peer node. Ideally in the 3GPP network for a single procedure the messages get exchanged between multiple entities. For a single attach procedure, the communication happens from UE to eNodeB, eNodeB to mobility management entity (MME), MME to home subscriber server (HSS), MME to serving gateway (SGW), SGWC to serving gateway user plane (SGW-U), serving gateway control plane (SGW-C) to packet core gateway control plane (PGW-C), PGW-C to policy and charging rules function (PCRF), PGW-C to online charging system (OCS) and PGW-C to packet core gateway user plane (PGW-U). So the timers configured in one node will be dependent or relative to another Node. At the same time if a response message is not received from one node, then the originating node after all the retransmissions are over will identify the transaction as a failure and respond back in the similar way. In the CUPS architecture the UP nodes are deployed close to RAN which increases a probability of fluctuations between the CP nodes and the UP nodes. The fluctuations may stay for a couple of seconds which can result in loss of the N1 retry messages which are configured in 4 seconds to 8 seconds (for all retransmissions) in the wireless network.

At the end of a session termination procedures are initiated by the transmitter node by transmitting one of a session deletion request message or a session report request (transmitted for termination) depending on the transmitter node which happens once in lifetime or at end of session. If the session deletion request message or the session report request is not received by the receiver node even after all retries, the CP node will miss most critical information (usage information) and updates the usage information as Zero in the CDR which is to be transmitted to the charging servers. As a result, operators face business revenue loss along with inaccurate charging for an end user.

Referring now to the drawings and more particularly to FIGS. 2, 3A, 3B, 4, 5A, 5B, 6A, 6B, 7 and 8, where similar reference characters denote corresponding features consistently throughout the figure, these are shown preferred embodiments.

Figure 2:
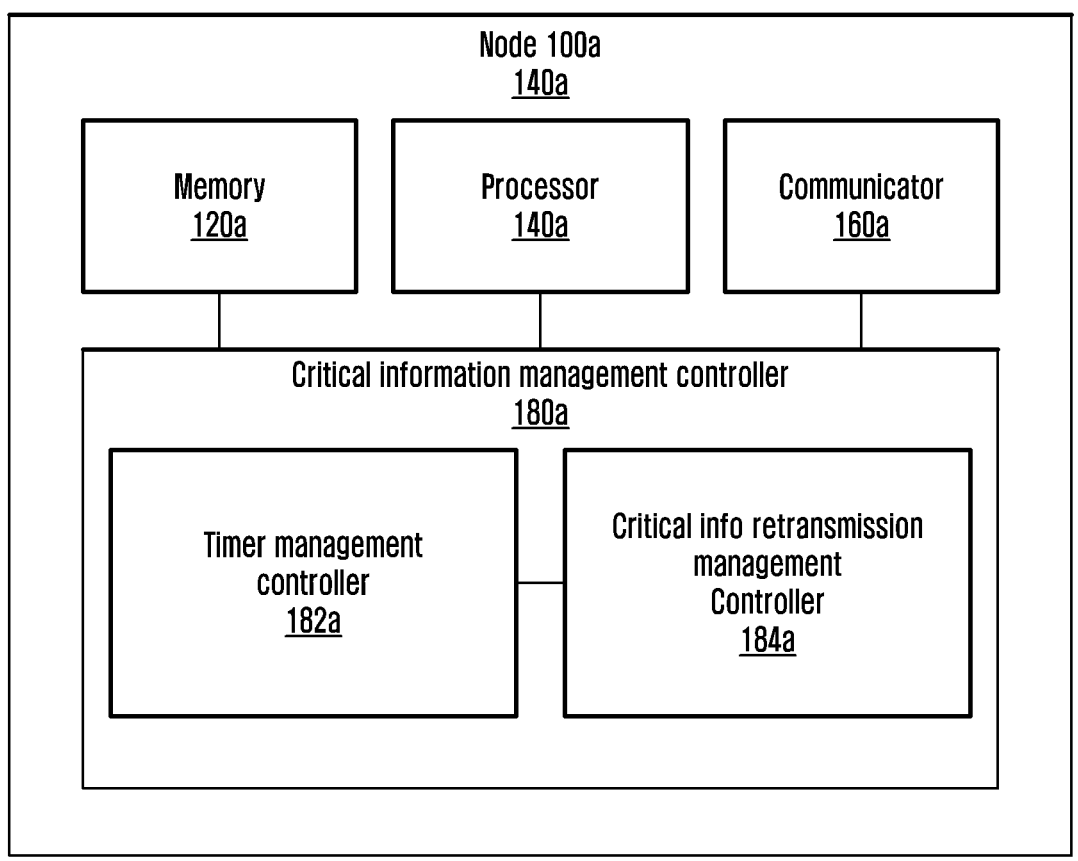
FIG. 2 is a block diagram of a node for transmitting critical information by a node in a CUPS in a wireless network according to an embodiment of the disclosure.

FIG. 2 is a block diagram of a node for transmitting critical information by a node in a control and user plane separation (CUPS) in a wireless network according to an embodiment of the disclosure.

Referring to FIG. 2, a node (100a) and another node (100b) are used interchangeably and is part of the CUPS in the wireless network. Although another node (100b) is not illustrated in FIG. 2, the another node (100b) may have the same configuration as the node (100a). The node (100a) includes a memory (120a), processor (140a), a communicator (160a) and a critical information management controller (180a). In the description of FIG. 2, the node (100a) will be described as an example.

The memory (120a) is configured to store session information and timer information associated with the session. The memory (120a) comprises instructions to be executed on the processor (140a). The memory (120a) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120a) may, in some examples, be considered a non-transitory storage medium. The term "non-transitory" may indicate that the storage medium is not embodied in a carrier wave or a propagated signal. However, the term "non-transitory" should not be interpreted that the memory (120a) is non-movable. In some examples, the memory (120a) is configured to store larger amounts of information than the memory. In certain examples, a non-transitory storage medium may store data that can, over time, change (e.g., in a random access memory (RAM) or cache).

In an embodiment of the disclosure, the processor (140a) is coupled to the memory (120a), the communicator (160a) and the critical information management controller (180a). The processor (140a) may include one or a plurality of processors. The one or the plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The processor (140a) may include multiple cores and is configured to execute the instructions stored in the memory (120a).

In an embodiment of the disclosure, the communicator (160a) is configured to facilitate communication between the various hardware components of the node (100a) and between the node (100a) and another node (100b).

In an embodiment of the disclosure, the critical information management controller (180a) is configured to determine a retry threshold for retransmission of a Sx message to another node (100b) is reached and activate a message re-transmission timer on determining that the retry threshold for the transmission of the Sx message to the another node (100b) is reached. The Sx message includes critical information, such as for example but not limited to charging information, usage information, or the like. Further, the critical information management controller (180a) is configured to retransmit the Sx message to the another node (100b) at exponential intervals of time until an expiry of the message re-transmission timer. The critical information management controller (180a) is configured to transmit the Sx message to the another node (100b) in the CUPS of the wireless network and determine a Sx response message is not received from the another node (100b). Further, the critical information management controller (180a) is configured to retransmit the Sx message to the another node (100b) until the retry threshold is reached by increasing a time to wait for each of the Sx response message in an exponential pattern. The retry threshold is a configured number of retries and determine the retry threshold for the retransmission of the Sx message to the another node (100b) is reached. The retry threshold for retransmission of the Sx message is determined based on a T1 timer which retires for specific number of times based on a packet forwarding control protocol (PFCP) protocol. The number of retries is configurable and can be controlled manually or automatically.

The critical information management controller (180a) is further configured to receive the Sx response message from the another node (100b) before the expiry of the message re-transmission timer, and delete the session information from one of a and a local memory comprising the session information. Therefore, unlike the methods and systems of the related art, in the proposed method the session information is deleted only when the Sx response message is received from the another node (100b) before the expiry of the message re-transmission timer.

Time manager controller (182a) may determine or identify whether the existing retransmissions (N1 and T1 Timers are completed) and new timer (introduced in this patent) has to be started.

Critical info retransmission management controller (184a) may manage to retain the session context in UDSF and control to retransmit the message again in an exponential way to the peer Sx node based on the new configuration.

When the node (100a) is a user plane (UP) node and the another node (100b) is a control plane (CP) node, then the Sx message is a session report request message transmitted from the UP node to the CP node.

When the node (100a) is a control plane (CP) node and the another node (100b) is a user plane (UP) node, then the Sx message is a session delete request message transmitted from the CP node to the UP node.

The critical information is charging information is determined by the UP node by tracking a network usage per PDN session based on a volume of data packets transferred and the charging information is transmitted to the CP node in the Sx message. The CP node generates a charging data record (CDR) comprising a volume of data used for a particular PDN service bearer for a user. The message re-transmission timer is linked with a session in one of an unstructured data storage function (UDSF) (1000) illustrated in FIGS. 5B and 6B and a local memory (120a) for storing session information.

Although the FIG. 2 shows the hardware elements of the node (100a) but it is to be understood that other embodiments are not limited thereon. In other embodiments of the disclosure, the node (100a) may include less or more number of elements. Further, the labels or names of the elements are used only for illustrative purpose and does not limit the scope of the disclosure. One or more components can be combined together to perform same or substantially similar function.

Figure 3A:
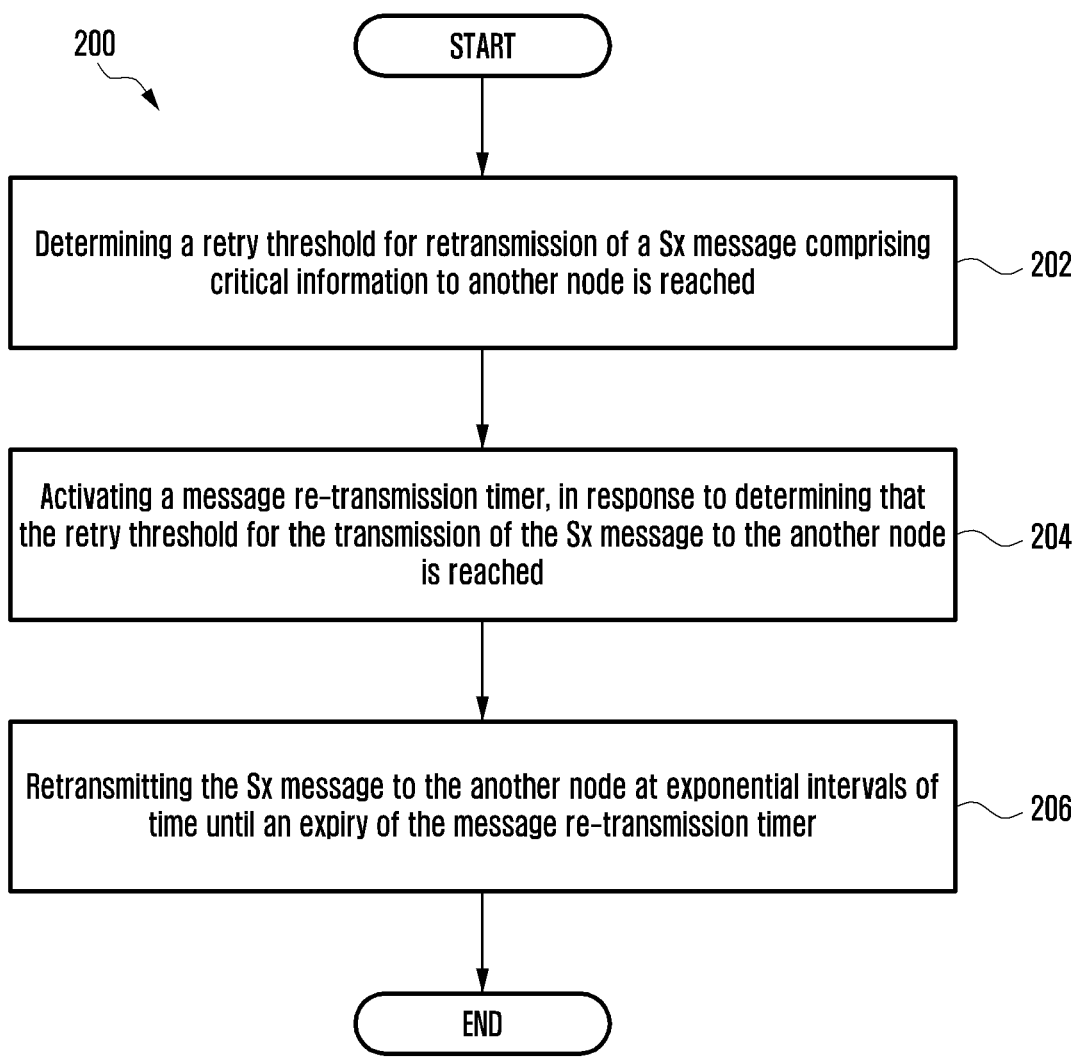
FIG. 3A is a flowchart for a method for transmitting critical information by a node in a CUPS in a wireless network according to an embodiment of the disclosure.

FIG. 3A is a flowchart 200 for a method for transmitting critical information by node in CUPS in a wireless network according to an embodiment of the disclosure.

Referring to FIG. 3A, at operation 202, the method includes the node (100a) determining the retry threshold for retransmission of the Sx message comprising critical information to another node is reached. For example, in the node (100a) described in the FIG. 2, the critical information management controller (180a) is configured to determine the retry threshold for retransmission of the Sx message comprising critical information to another node is reached.

At operation 204, the method includes the node (100a) activating the message re-transmission timer, in response to determining that the retry threshold for the transmission of the Sx message to the another node (100b) is reached. For example, in the node (100a) described in the FIG. 2, the critical information management controller (180a) is configured to activate the message re-transmission timer, in response to determining that the retry threshold for the transmission of the Sx message to the another node (100b) is reached.

At operation 206, the method includes the node (100a) retransmitting the Sx message to the another node (100b) at exponential intervals of time until an expiry of the message re-transmission timer. For example, in the node (100a) described in the FIG. 2, the critical information management controller (180a) is configured to retransmit the Sx message to the another node (100b) at exponential intervals of time until an expiry of the message re-transmission timer.

The various actions, acts, blocks, steps, or the like in the method may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 3B:
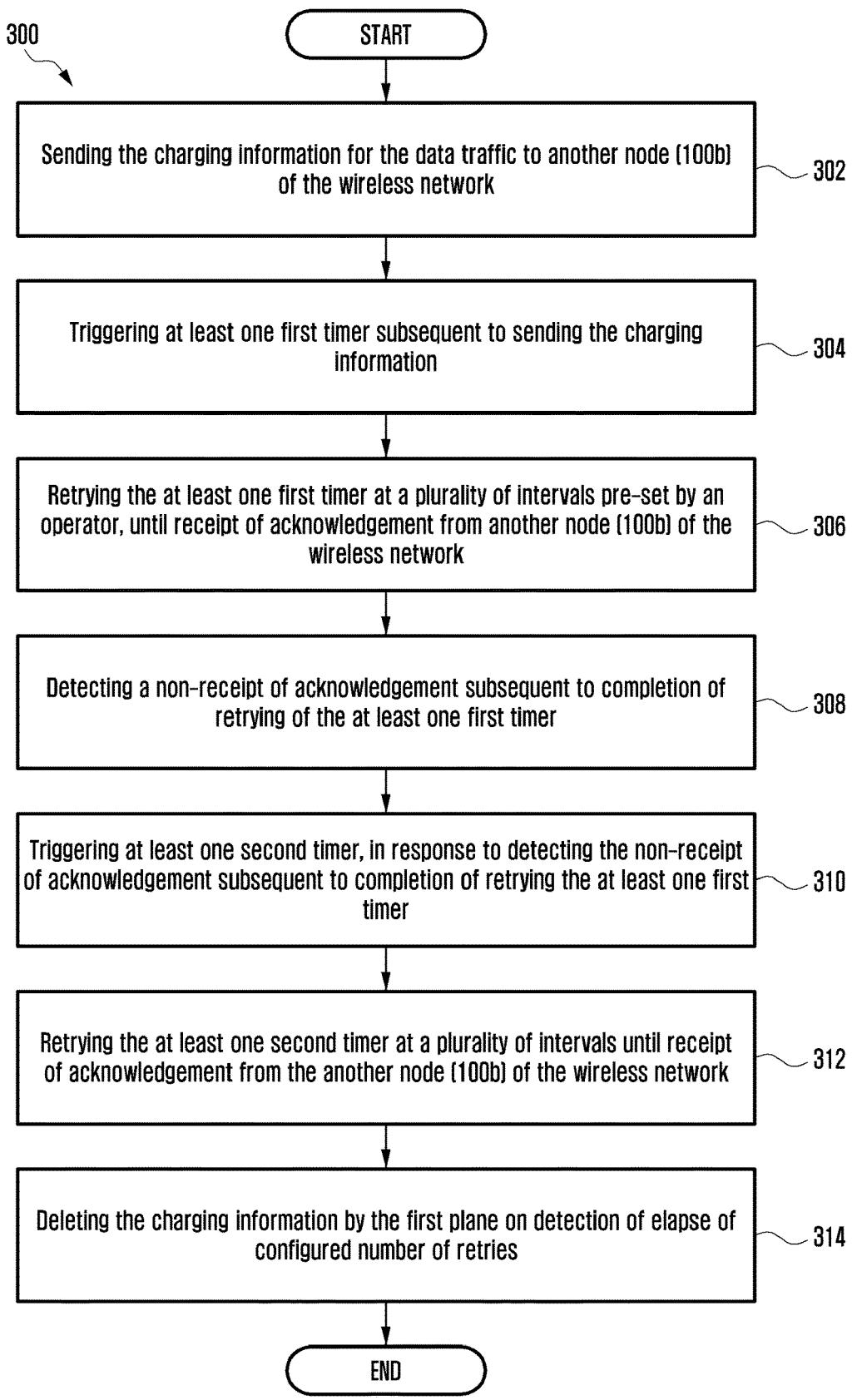
FIG. 3B is a flowchart illustrating a method for managing charging information for data traffic in a CUPS in a wireless network according to an embodiment of the disclosure.

FIG. 3B is a flowchart 300 illustrating a method for managing charging information for data traffic in a CUPS in a wireless network according to an embodiment of the disclosure.

Referring to FIG. 3B, at operation 302, the method includes the node (100a) transmitting the charging information for the data traffic to another node (100b) of the wireless network. For example, in the node (100a) described in the FIG. 2, the critical information management controller (180a) is configured to transmit the charging information for the data traffic to another node (100b) of the wireless network.

At operation 304, the method includes the node (100a) triggering the at least one first timer subsequent to transmitting the charging information. For example, in the node (100a) described in the FIG. 2, the critical information management controller (180a) is configured to trigger the at least one first timer subsequent to transmitting the charging information.

At operation 306, the method includes the node (100a) retrying the at least one first timer at the plurality of intervals pre-set by the operator, until receipt of acknowledgement from another node (100b) of the wireless network. For example, in the node (100a) described in the FIG. 2, the critical information management controller (180a) is configured to retry the at least one first timer at the plurality of intervals pre-set by the operator, until receipt of acknowledgement from another node (100b) of the wireless network.

At operation 308, the method includes the node (100a) detecting the non-receipt of acknowledgement subsequent to completion of retrying of the at least one first timer. For example, in the node (100a) described in the FIG. 2, the critical information management controller (180a) is configured to detect the non-receipt of acknowledgement subsequent to completion of retrying of the at least one first timer.

At operation 310, the method includes the node (100a) triggering the at least one second timer, in response to detecting the non-receipt of acknowledgement subsequent to completion of retrying the at least one first timer. For example, in the node (100a) described in the FIG. 2, the critical information management controller (180a) is configured to trigger the at least one second timer, in response to detecting the non-receipt of acknowledgement subsequent to completion of retrying the at least one first timer.

At operation 312, the method includes the node (100a) retrying the at least one second timer at the plurality of intervals until receipt of acknowledgement from the another node (100b) of the wireless network. For example, in the node (100a) described in the FIG. 2, the critical information management controller (180a) is configured to retry the at least one second timer at the plurality of intervals until receipt of acknowledgement from the another node (100b) of the wireless network.

At operation 314, the method includes the node (100a) deleting the charging information by the first plane on detection of elapse of configured number of retries. For example, in the node (100a) described in the FIG. 2, the critical information management controller (180a) is configured to delete the charging information by the first plane on detection of elapse of configured number of retries.

The various actions, acts, blocks, steps, or the like in the method may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 4:
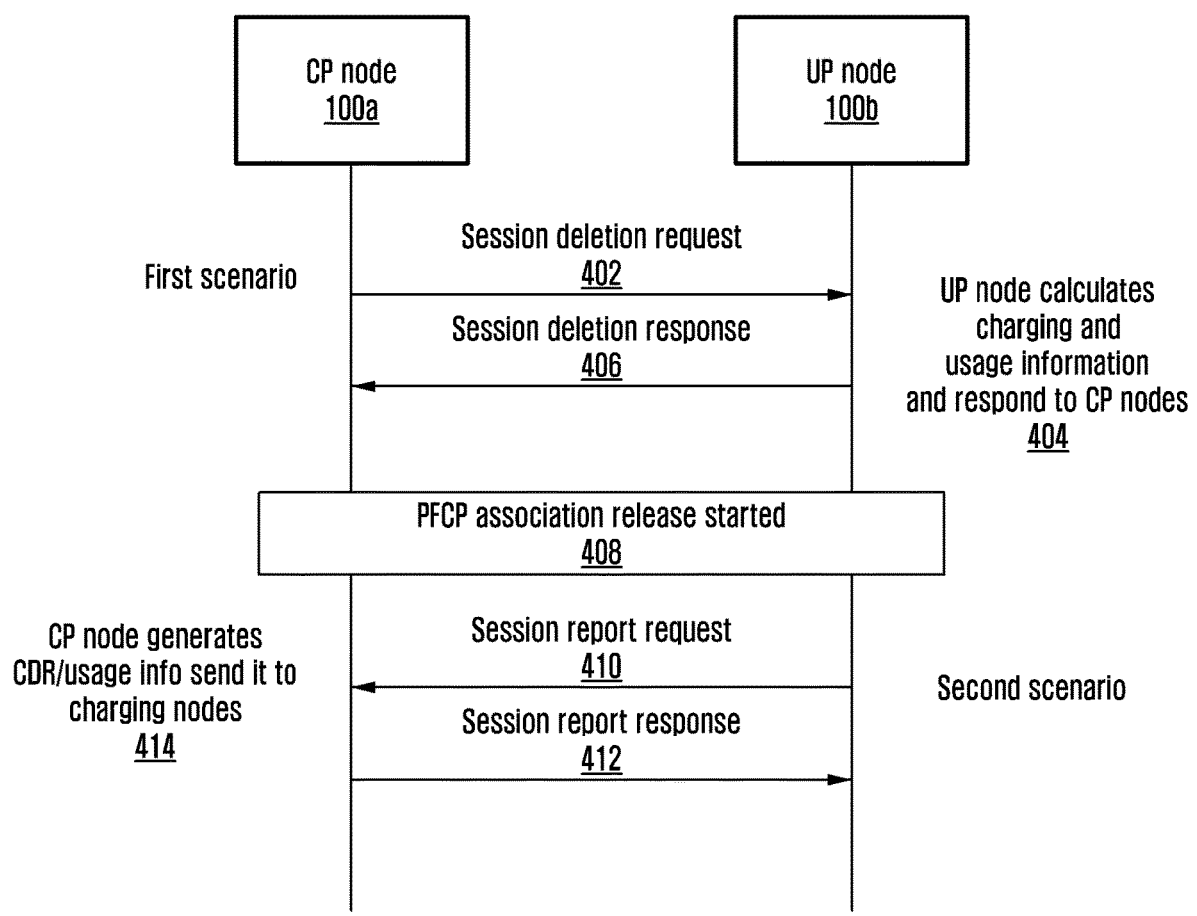
FIG. 4 is a signaling diagram illustrating a scenario of successful transmission and reception of critical information in a CUPS architecture of a wireless network according to an embodiment of the disclosure.

FIG. 4 is a signaling diagram illustrating a scenario of successful transmission and reception of critical information in a CUPS architecture of a wireless network according to an embodiment of the disclosure.

Referring to FIG. 4, consider a first scenario where at operation 402, the CP node (100a) transmits the SESSION DELETE REQUEST Message to the UP node (100b).

At operation 404, UP node (100b) calculates the charging and the usage information and at operation 406, the UP node (100b) responds to the CP node (100a) by transmitting the session deletion response with usage information to the CP node (100a). Further, the CP node (100a) uses the received usage information (URR Information) and generates CDRs and transmits the CDRs to various charging servers. Here the SESSION DELETE REQUEST Message is successfully received by the UP node (100b) and responded to by the UP node (100b).

Consider a second scenario, where at operation 408 the PFCP association release starts. At operation 410, as a part of the EPFAR procedure, the UP node (100b) transmits the SESSION REPORT REQUEST Message with termination trigger set and the usage information to the CP node (100a). At operation 412, the CP node (100a) replies by transmitting the session report response to the UP node (100b). Further, at operation 414 the CP node (100a) generates the CDR or the usage information and transmits the generated CDR or the usage information to the charging servers. Here the SESSION REPORT REQUEST Message is successfully received by the CP node (100a) and responded to by the CP node (100b). The first scenario and the second scenario may be ideal cases and may not be true when there are IP fluctuations or network fluctuations.

Figure 5A:
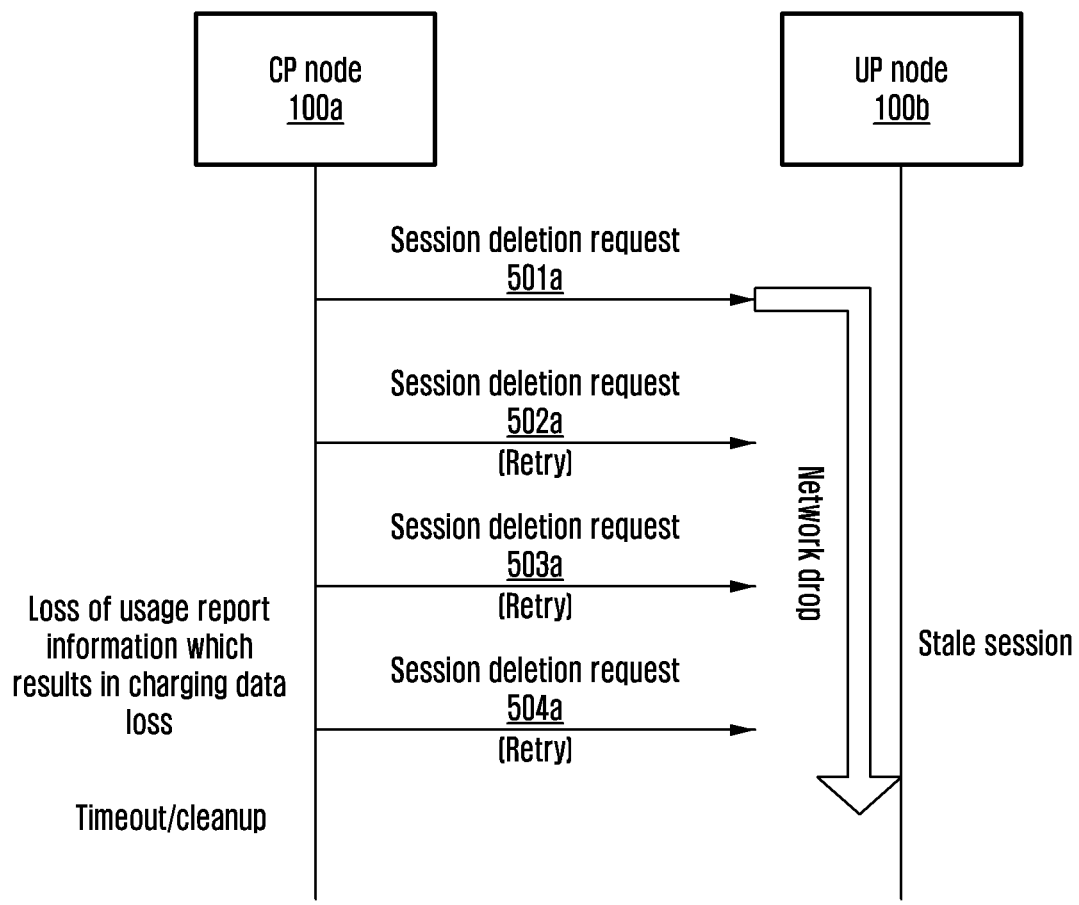
FIG. 5A is a signaling diagram illustrating a scenario of loss of a session deletion request message due to network fluctuation according to an embodiment of the disclosure.

FIG. 5A is a signaling diagram illustrating a scenario of loss of a session deletion request message due to network fluctuation according to an embodiment of the disclosure.

Referring to FIG. 5A, consider that the CP node (100a) has initiated the session delete request message due to delete request from a peer node. Due to IP Fluctuations, the session delete request message (transmitted at operation 501a) is dropped in the network and has not reached the UP node (100b).

Consider that the number of retransmissions is configured as 3 and time to wait for the response is 2 sec. All the retry messages transmitted by the CP node (100a) from operations 502a to 504a are also dropped in the network. Since there is no response from the UP node (100b) even after all the retries, the CP node (100a) will mark the session delete request message as Failure and generates the CDR with the usage information as 0 (which may not be correct).

Further, the CP node (100a) will delete the context internally from the UDSF (1000) or a local memory of the CP node (100a) and transmit delete response to the originating node which has initiated the procedure. However, the session context entry in the UP node (100b) will remain stale.

Figure 5B:
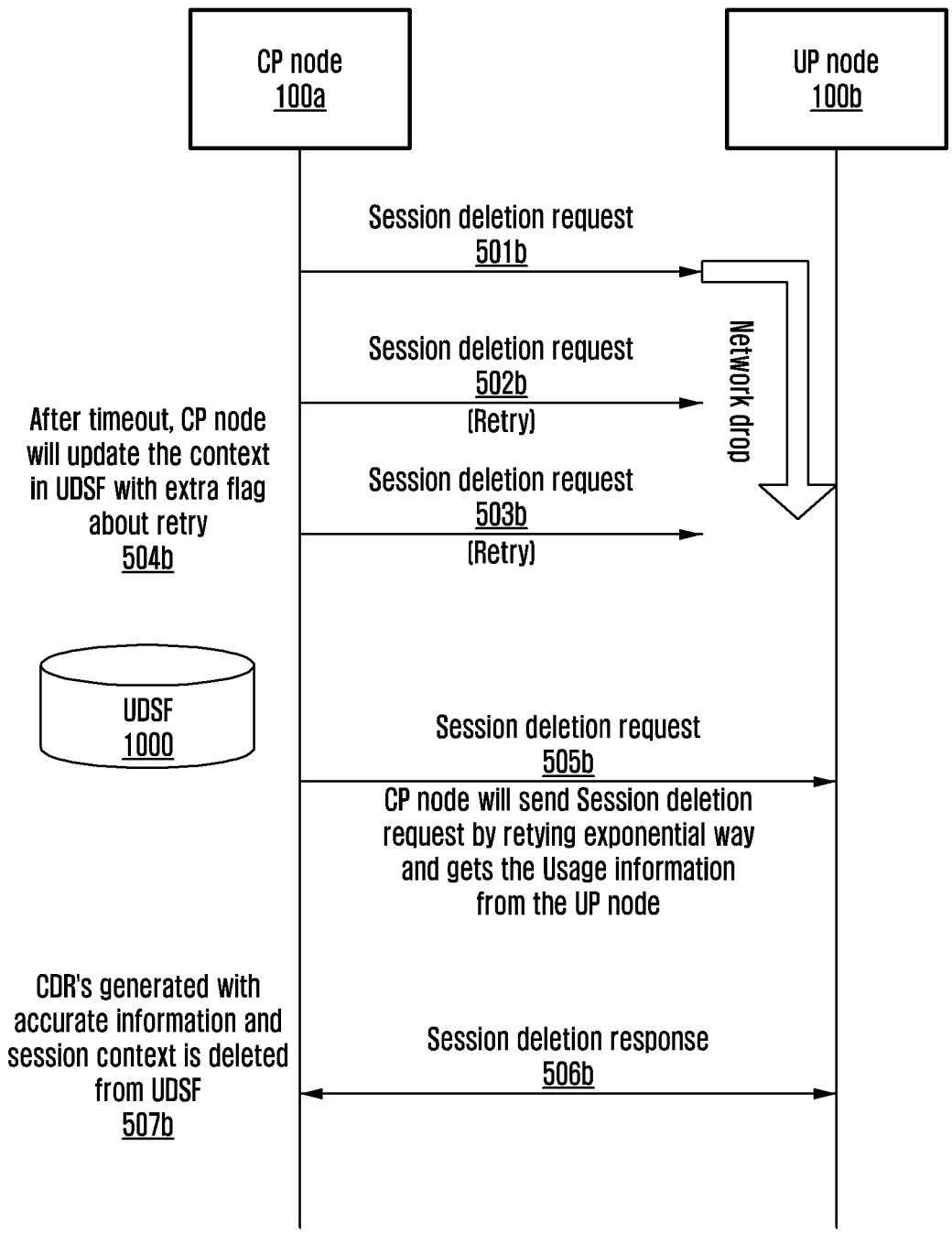
FIG. 5B is a signaling diagram illustrating a scenario of managing a loss of a session deletion request message due to a network fluctuation according to an embodiment of the disclosure.

FIG. 5B is a signaling diagram illustrating a scenario of managing a loss of a session deletion request message due to a network fluctuation according to an embodiment of the disclosure.

Referring to FIG. 5B, in conjunction with the FIG. 5A, the operations 501a to 503a in the FIG. 5A are same as the operations 501b to 503b in the FIG. 5B. Hence, a repeated description is omitted. When the session delete response message is not received and the session details are to be cleaned up in the CP node (100a), the proposed method is executed rather than clearing the session information with the reason as failure or "No response from the peer node". When the session delete response message is not received for the session delete request message in the CP node (100a), then the session information is not deleted even after all the PFCP retries are completed. The deletion response to the originating nodes is transmitted except for charging servers. Further, at operation 504b, the message re-transmission timer i.e., a longer timer for example in between 5 to 10 min is created and linked with the session in the UDSF (1000) or the local memory (120a) which stores the session information.

At operation 505b, the session deletion request message is retried towards the UP Node (100b) in an exponential fashion until a long configured timer or a response message is received. At operation 506b, the session deletion response is received from the UP Node (100b) and at operation 507b, the CP node (100a) generates the CDR with accurate information and session context is deleted from the UDSF (1000). Since, the new retry timer is incremented in exponential form the impact of the load on the system due to the new retry messages will be low and has very high probability of getting response.

Figure 6A:
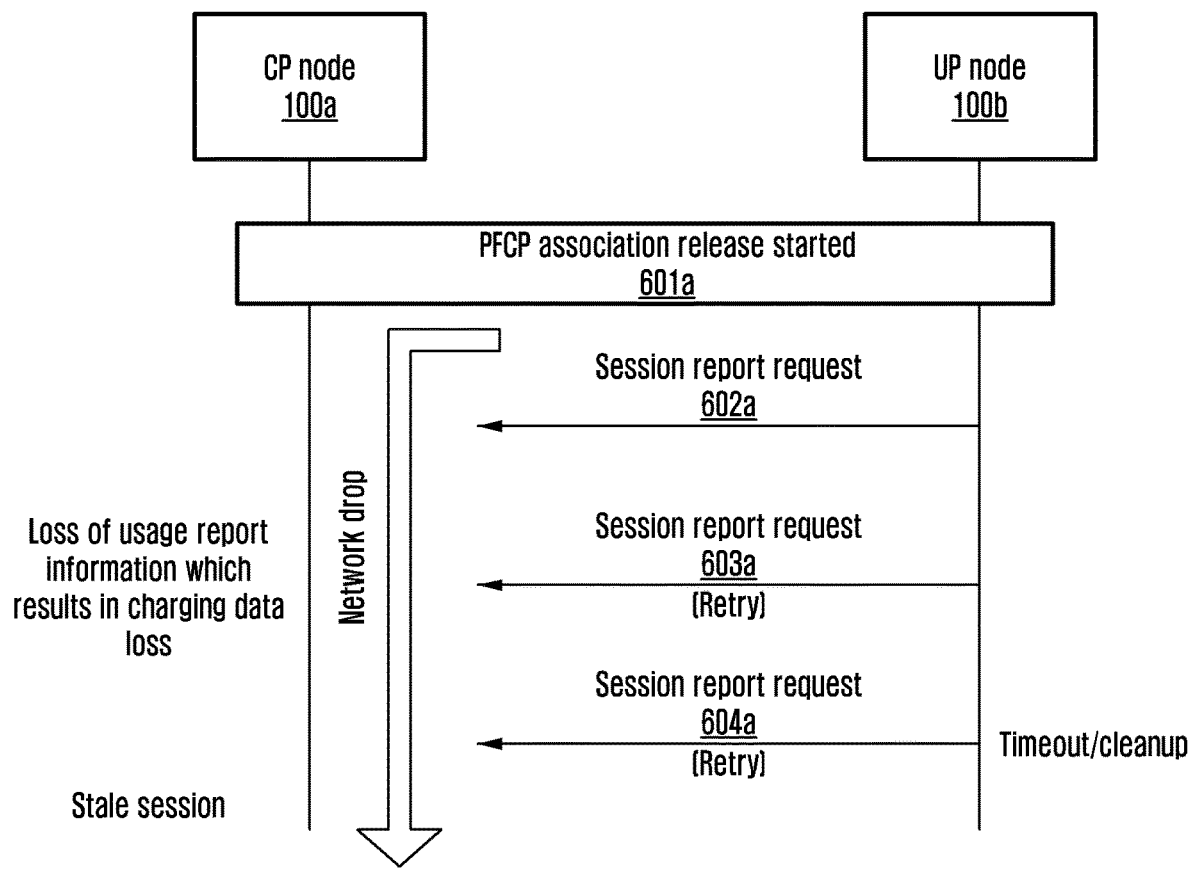
FIG. 6A is a signaling diagram illustrating a scenario of loss of a session report request message due to a network fluctuation according to an embodiment of the disclosure.

FIG. 6A is a signaling diagram illustrating a scenario of loss of a session report request message due to network fluctuation according to an embodiment of the disclosure.

Referring to FIG. 6A, as per the Enhanced PFCP Association release (EPFAR) procedure defined in 3GPP 29.244 Rel. 16 Sec 5.18 and sec 6.2.8 when any of the CP node (100a) or the UP node (100b) wants to release the PFCP Association in between them at operation 601a, the UP node (100b) will transmit the session report request for all the sessions which contains the usage information.

At operation 602a, consider that the UP node (100b) transmits the session report request by setting the trigger to termination by UP function report (TEBUR) flag. Further, due to IP fluctuations, all the session report request messages (including retries) are dropped in the network (at operations 603a to 604a). Since the UP node (100b) has not received the response even after all retries, the UP node (100b) will delete the context internally. The usage information is not received in the CP node (100a) and hence the usage information will be reported as 0 in the CDRs which may be incorrect and inaccurate.

Figure 6B:
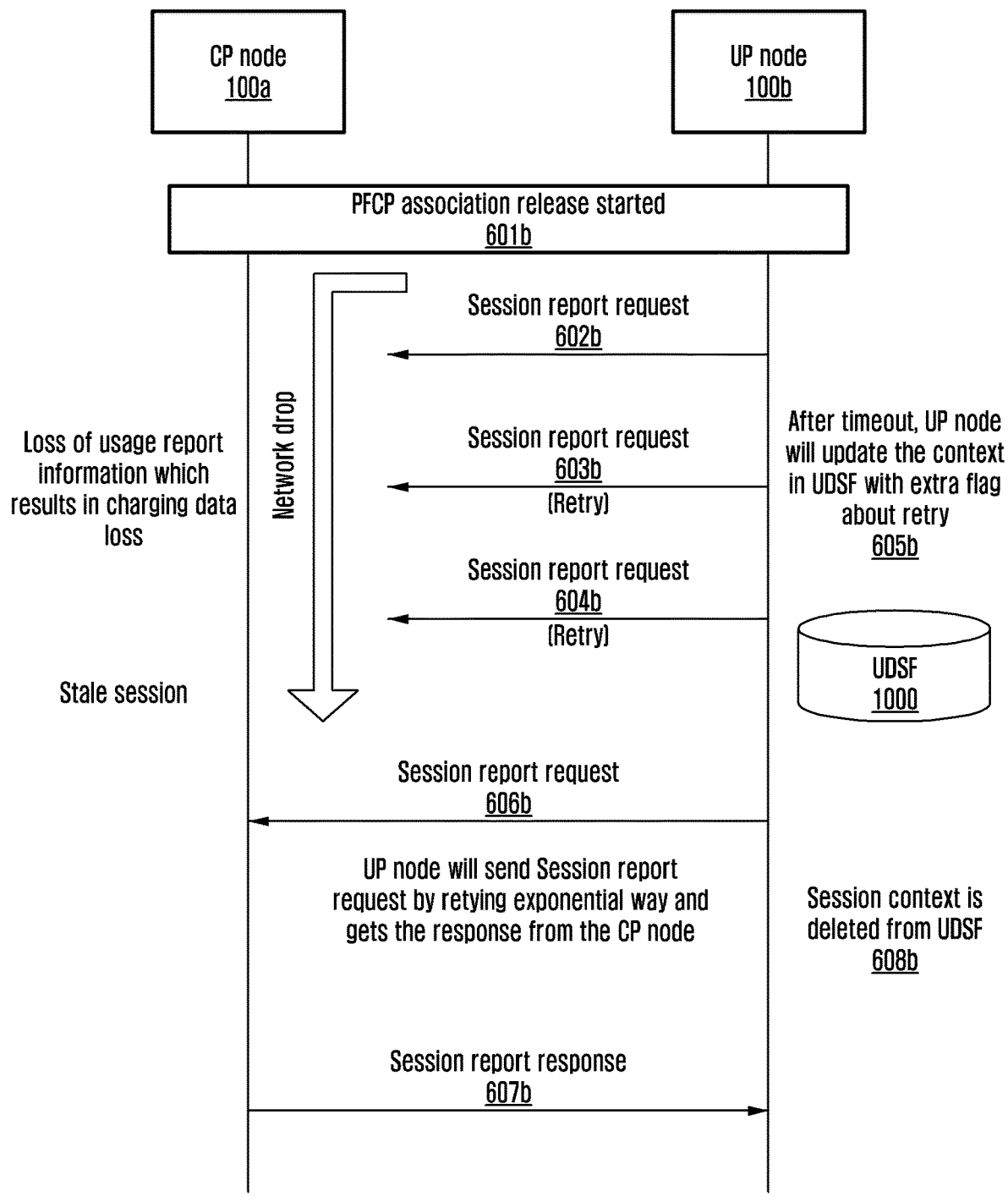
FIG. 6B is a signaling diagram illustrating a scenario of managing a loss of a session report request message due to a network fluctuation according to an embodiment of the disclosure.

FIG. 6B is a signaling diagram illustrating a scenario of managing a loss of a session report request message due to a network fluctuation according to an embodiment of the disclosure.

Referring to FIG. 6B in conjunction with the FIG. 6A, the operations 601a to 604a in the FIG. 6A are same as the operations 601b to 604b in the FIG. 6B. Hence, a repeated description is omitted. When the session report response message is not received and the session details are to be cleaned up in the UP node (100b), the proposed method is executed rather than clearing the session information with the reason as failure or "No response from the peer node". When the session report response message is not received for the session report request message in the UP node (100b), then the session information is not deleted even after all the PFCP retries are completed. Further, at operation 605b, the message re-transmission timer i.e., a longer timer for example in between 5 to 10 min is created and linked with the session in the UDSF (1000) or the local memory (120b) which stores the session information.

At operation 606b, the session report request message is retried towards the CP Node (100a) in an exponential fashion until a long configured timer or a response message is received. At operation 607b, the session report response is received from the CP Node (100a) and the UP node (100b) deletes the session context from the UDSF (1000) at operation 608b. The session context may contain the user data that is transmitted via user plane in session report request message.

An analytical model for the impacted sessions is formulated as below.

Let, $F_T$—fluctuation time, be the total time during which the connectivity between the CP (100a) and UP node (100b) is having issues.

$TX_{PS}$—number of messages transmitted between the UP and the CP nodes per second.

$Re_{TMR}$—retransmission timer configured in the CP node (100a).

N—maximum number of retransmissions when there is no response.

$TR_{TMR}$—Total time taken for the initial message and all retransmission messages.

The CP node (100a) or the UP Node (100b) transmits message and waits for $Re_{TMR}$ seconds, if no response is received then retransmits the message again. This process repeats until either response is received or number of retransmissions N is completed. Based on this the total time for retransmissions to be completed is calculated as:

$$TR_{TMR} = N \times Re_{TMR} + Re_{TMR} \qquad \text{Equation 1}$$

Sessions whose first and last retransmission is within the fluctuation time i.e., all the message transmissions occurred during the fluctuation are impacted as any response is not received for the requests sent. The impacted sessions (IS) are directly proportional to the difference between fluctuation time $F_T$ and total retransmission time and number of messages per sec ($TX_{PS}$), $$IS = (F_T - TR_{TMR}) \times TX_{PS}, F_T > TR_{TMR} \qquad \text{Equation 2}$$

$$IS = 0, F_T < TR_{TMR} \qquad \text{Equation 3}$$

Figure 7:
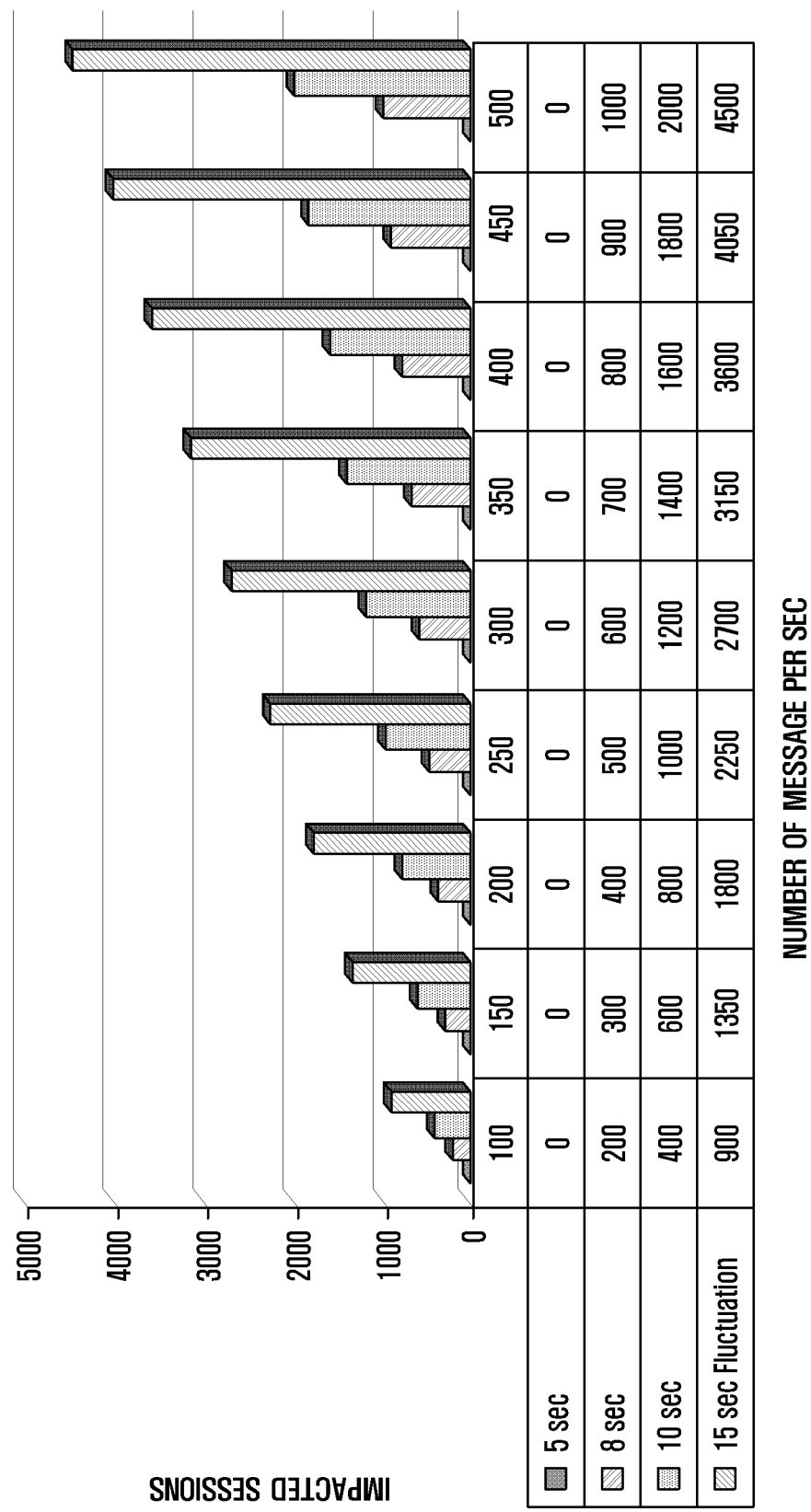
FIG. 7 is a graph illustrating impacted sessions against requests per second for multiple fluctuation intervals according to an embodiment of the disclosure.

FIG. 7 is a graph illustrating impacted sessions against requests per second for multiple fluctuation intervals according to an embodiment of the disclosure.

Referring to FIG. 7, the impacted sessions are directly proportional to the fluctuation time ($F_T$) along with the number of messages per sec ($TX_{PS}$). The FIG. 7 shows that the impacted sessions increase when the fluctuation time ($F_T$) and messages per sec ($TX_{PS}$).

The number of messages per sec ($TX_{PS}$) is represented on the X-Axis. The simulation is made for 4 different fluctuation time's ($F_T$) 5 sec, 8 sec, 10 sec and 15 sec. The impacted sessions (IS) are represented on the Y-Axis. The increase in the impacted sessions (IS) with the increase of fluctuation time ($F_T$) and the messages per sec ($TX_{PS}$) are observed in the graph. The fluctuation time ($F_T$) 5 sec is less than the total retransmission time ($TR_{TMR}$) which is 6 sec, hence the Impacted Sessions (IS) observed for the example is zero.

Figure 8:
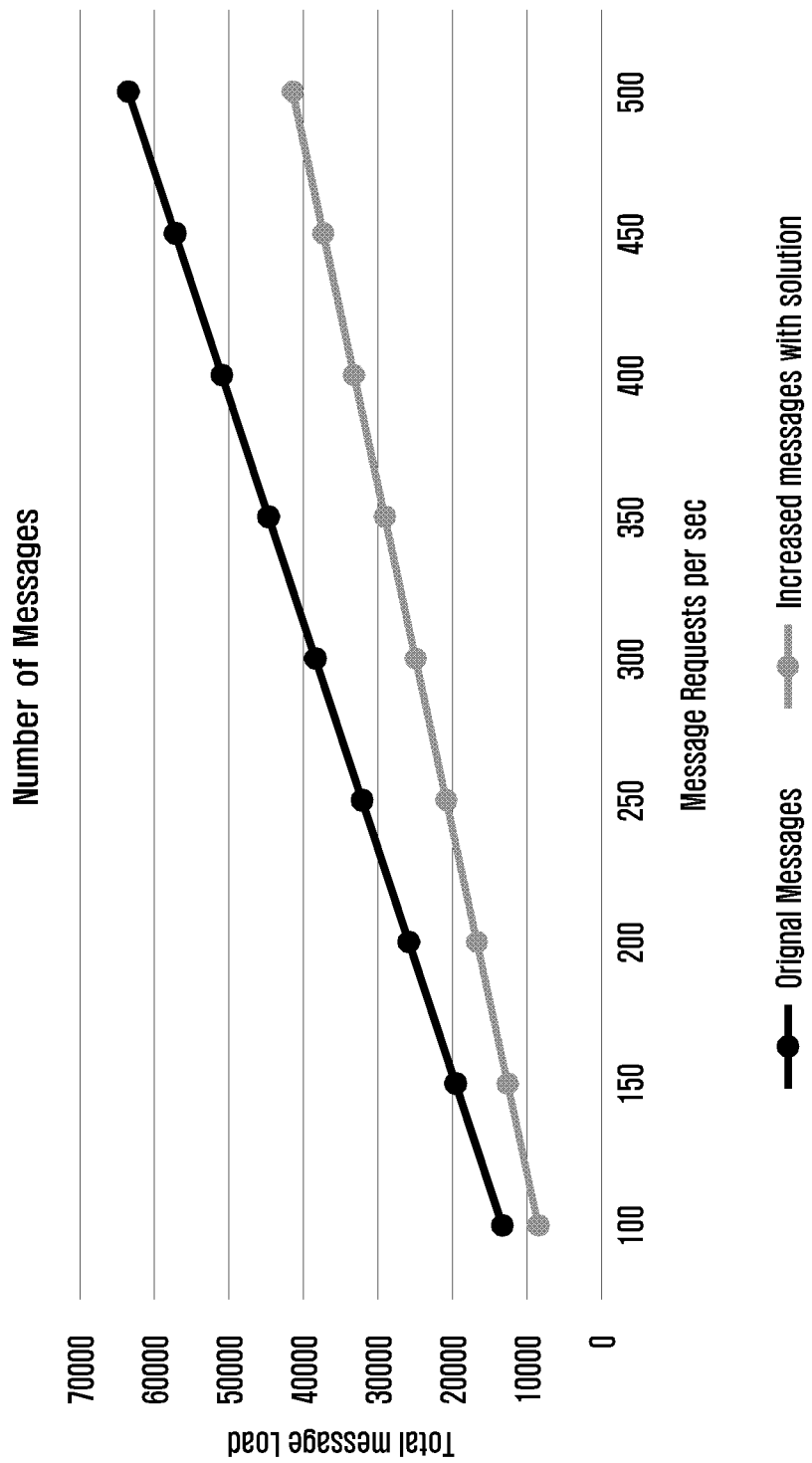
FIG. 8 is a graph illustrating increase in a load of a wireless network while transmitting critical information according to an embodiment of the disclosure.

FIG. 8 is a graph illustrating increase in a load of a wireless network while transmitting critical information according to an embodiment of the disclosure.

Referring to FIG. 8, a plot with Load on the systems, number of messages received is represented on Y-Axis and messages per sec (TXPS) is represented on the X-Axis. The FIG. 8 is made for a single iteration with a high fluctuation time (FT) of 30 sec. Therefore, an increase in the load is observed if the system is small but the impacted sessions (IS) count of zero is achieved even with a fluctuation time (FT) of 30 sec.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting critical information by a node in a control and user plane separation (CUPS) in a wireless network, the method comprises:
   determining a retry threshold for retransmission of a Sx message comprising critical information to a second node is reached;
   activating a message re-transmission timer, in response to determining that the retry threshold for the transmission of the Sx message to the second node is reached; and
   re-transmitting the Sx message to the second node at exponential intervals of time until an expiry of the message re-transmission timer,
   wherein, when the Sx message is not received for a session report request message in a user plane (UP) node, retain session information upon after packet forwarding control protocol (PFCP) retries related to the Sx message are completed.

2. The method of claim 1, wherein the determining of the retry threshold for retransmission of the Sx message to the second node is reached comprises:
   transmitting the Sx message to the second node in the CUPS of the wireless network;
   determining a Sx response message is not received from the second node;
   re-transmitting the Sx message to the second node until the retry threshold is reached by increasing a time to wait for each of the Sx response message in an exponential pattern, wherein the retry threshold is a configured number of retries; and
   determining the retry threshold for the retransmission of the Sx message to the second node is reached.

3. The method of claim 2, wherein the message re-transmission timer is linked with a session in one of an unstructured data storage function (UDSF) or a local memory for storing the session information.

4. The method of claim 3, further comprising:
receiving the Sx response message from the second node before the expiry of the message re-transmission timer; and
deleting the session information from the one of UDSF or the local memory comprising the session information.

5. The method of claim 1,
wherein the Sx message is a session report request message transmitted from the UP node to a control plane (CP) node, and
wherein the UP node is the node and the CP node is the second node.

6. The method of claim 1,
wherein the Sx message is a session delete request message transmitted from a CP node to a UP node, and
wherein the CP node is the node and the UP node is the second node.

7. The method of claim 1, wherein the retry threshold for retransmission of the Sx message is determined based on a T1 timer which retires for a specific number of times based on the PFCP protocol.

8. The method of claim 1, wherein the critical information is charging information determined by the UP node by tracking a network usage per PDN session based on a volume of data packets transferred, and
wherein the charging information is transmitted to a control plane (CP) node in the Sx message.

9. The method of claim 8, wherein the CP node generates a charging data record (CDR) comprising a volume of data used for a particular PDN service bearer for a user.

10. A first node in a control and user plane separation (CUPS) for transmitting critical information in a wireless network, the first node comprising:
memory;
communication circuitry; and
at least one processor coupled to the memory and the communication circuitry, and configured to:
determine a retry threshold for retransmission of a Sx message comprising critical information to a second node is reached,
activate a message re-transmission timer, in response to determining that the retry threshold for the transmission of the Sx message to the second node is reached, and
retransmit the Sx message to the second node at exponential intervals of time until an expiry of the message re-transmission timer, and
wherein, when the Sx message is not received for a session report request message in a user plane (UP) node, retain session information upon after packet forwarding control protocol (PFCP) retries related to the Sx message are completed.

11. The node of claim 10, wherein the at least one processor is configured to determine the retry threshold for retransmission of the Sx message to the second node is reached comprises:
transmits the Sx message to the second node in the CUPS of the wireless network;
determine a Sx response message is not received from the second node;
retransmit the Sx message to the second node until the retry threshold is reached by increasing a time to wait for each of the Sx response message in an exponential pattern, wherein the retry threshold is a configured number of retries; and
determine the retry threshold for the retransmission of the Sx message to the second node is reached.

12. The node of claim 11, wherein the message re-transmission timer is linked with a session in one of a unstructured data storage function (UDSF) or a local memory for storing a session information.

13. The node of claim 12, wherein the at least one processor is further configured to:
receive the Sx response message from the second node before the expiry of the message re-transmission timer, and
delete the session information from the one of UDSF or the local memory comprising the session information.

14. The node of claim 10,
wherein the Sx message is a session report request message transmitted from a user plane (UP) node to a control plane (CP) node, and
wherein the UP node is the node and the CP node is the second node.

15. The node of claim 10,
wherein the Sx message is a session delete request message transmitted from a CP node to a UP node, and
wherein the CP node is the node and the UP node is the second node.

16. The node of claim 10, wherein the retry threshold for retransmission of the Sx message is determined based on a T1 timer which retires for a specific number of times based on the PFCP protocol.

17. The node of claim 10, wherein the critical information is charging information determined by the UP node by tracking a network usage per PDN session based on a volume of data packets transferred, and
wherein the charging information is transmitted to a control plane (CP) node in the Sx message.

18. The node of claim 17, wherein the CP node generates a charging data record (CDR) comprising a volume of data used for a particular PDN service bearer for a user.

19. A method for managing charging information for data traffic by a node in a control and user plane separation (CUPS) in wireless network, the method comprises:
transmitting the charging information for the data traffic to another node of the wireless network;
triggering at least one first timer subsequent to transmitting the charging information;
retrying the at least one first timer at a plurality of intervals pre-set by an operator, until receipt of acknowledgement from a second node of the wireless network;
detecting a non-receipt of acknowledgement subsequent to completion of retrying of the at least one first timer;
triggering at least one second timer, in response to detecting the non-receipt of acknowledgement subsequent to completion of retrying the at least one first timer;
retrying the at least one second timer at a plurality of intervals until receipt of acknowledgement from the second node of the wireless network, wherein a magnitude of each subsequent interval of the plurality of intervals increases exponentially; and
deleting the charging information by a first plane on detection of elapse of configured number of retries,
wherein if the node is a control plane (CP) node, and then the second node is a user plane (UP) node,
wherein if the node is a UP node, and then the second node is a CP node, and
wherein the charging information for the data traffic is a charging data record (CDR) comprising a volume of data used for a particular packet data networks (PDN) service bearer for a user.

20. A node for managing charging information for data traffic in a control and user plane separation (CUPS) in wireless network, the node comprising:
- memory;
- communication circuitry; and
- at least one processor coupled to the memory and the communication circuitry, and configured to:
  - transmit the charging information for the data traffic to a second node of the wireless network,
  - trigger at least one first timer subsequent to transmitting the charging information,
  - retry the at least one first timer at a plurality of intervals pre-set by an operator, until receipt of acknowledgement from another node of the wireless network,
  - detect a non-receipt of acknowledgement subsequent to completion of retrying of the at least one first timer,
  - trigger at least one second timer, in response to detecting the non-receipt of acknowledgement subsequent to completion of retrying the at least one first timer,
  - retry the at least one second timer at a plurality of intervals until receipt of acknowledgement from the second node of the wireless network, wherein a magnitude of each subsequent interval of the plurality of intervals increases exponentially, and
  - delete the charging information by a first plane on detection of elapse of configured number of retries, wherein if the node is a control plane (CP) node, and then the second node is a user plane (UP) node, wherein if the node is a UP node, and then the second node is a CP node, and wherein the charging information for the data traffic is a charging data record (CDR) comprising a volume of data used for a particular packet data networks (PDN) service bearer for a user.

* * * * *